(12) United States Patent
Watts

(10) Patent No.: US 7,530,532 B2
(45) Date of Patent: May 12, 2009

(54) COUNTERWEIGHT BASED ROCKET LAUNCH PLATFORM

(76) Inventor: Keith Peter Watts, 2641 Palos Verdes Dr. North, Rolling Hills Estates, CA (US) 90274

( * ) Notice: Subject to any disclaimer, the term of this patent is extended or adjusted under 35 U.S.C. 154(b) by 483 days.

(21) Appl. No.: 11/480,120

(22) Filed: Jul. 3, 2006

(65) Prior Publication Data

US 2008/0001027 A1    Jan. 3, 2008

(51) Int. Cl.
*B64G 1/40* (2006.01)
(52) U.S. Cl. .................. 244/171.3; 244/171.5
(58) Field of Classification Search .............. 244/171.3, 244/171.5, 158.1, 171.1
See application file for complete search history.

(56) References Cited

U.S. PATENT DOCUMENTS

| | | | | |
|---|---|---|---|---|
| 5,143,327 | A | * | 9/1992 | Martin ..................... 244/171.3 |
| 5,242,135 | A | * | 9/1993 | Scott ........................ 244/171.3 |
| 5,568,901 | A | * | 10/1996 | Stiennon ....................... 244/63 |
| 6,113,032 | A | * | 9/2000 | Cochran et al. ......... 244/135 R |

OTHER PUBLICATIONS http://science.howstuffworks.com/elevator.htm/printable, Elevator.*
http://www.abbess.com/vac/homepage-vac.html, vacuum chambers.*
http://science.howstuffworks.com/air-breathing-rocket.htm/printable, Ramjet.*
http://www.atlasmissilesilo.com, Atlas Missile Silo.*

* cited by examiner

*Primary Examiner*—Timothy D Collins
(74) *Attorney, Agent, or Firm*—Kermit D Lopez; Luis M Ortiz; Ortiz & Lopez PLLC

(57) ABSTRACT

A counterweight based rocket launch platform system and method uses gravity acting upon a counterweight to provide the initial assent for a rocket. This counterweight system is preferably built inside of a mountain so as to use the mountain as the supporting structure. By covering the exit opening with a thin membrane and closing the bottom, the system can have the air evacuated providing a free ascent without a terminal velocity. During the final moments of the ascent or after the rocket leaves the tube, the rocket will ignite carrying the payload into space. The velocity imparted to the rocket from the gravity assist in combination with bypassing the thickest part of the atmosphere will lower the amount of fuel required to lift payloads into space. This will result in increased payloads of existing rockets or the use of smaller and less expensive rockets.

20 Claims, 2 Drawing Sheets

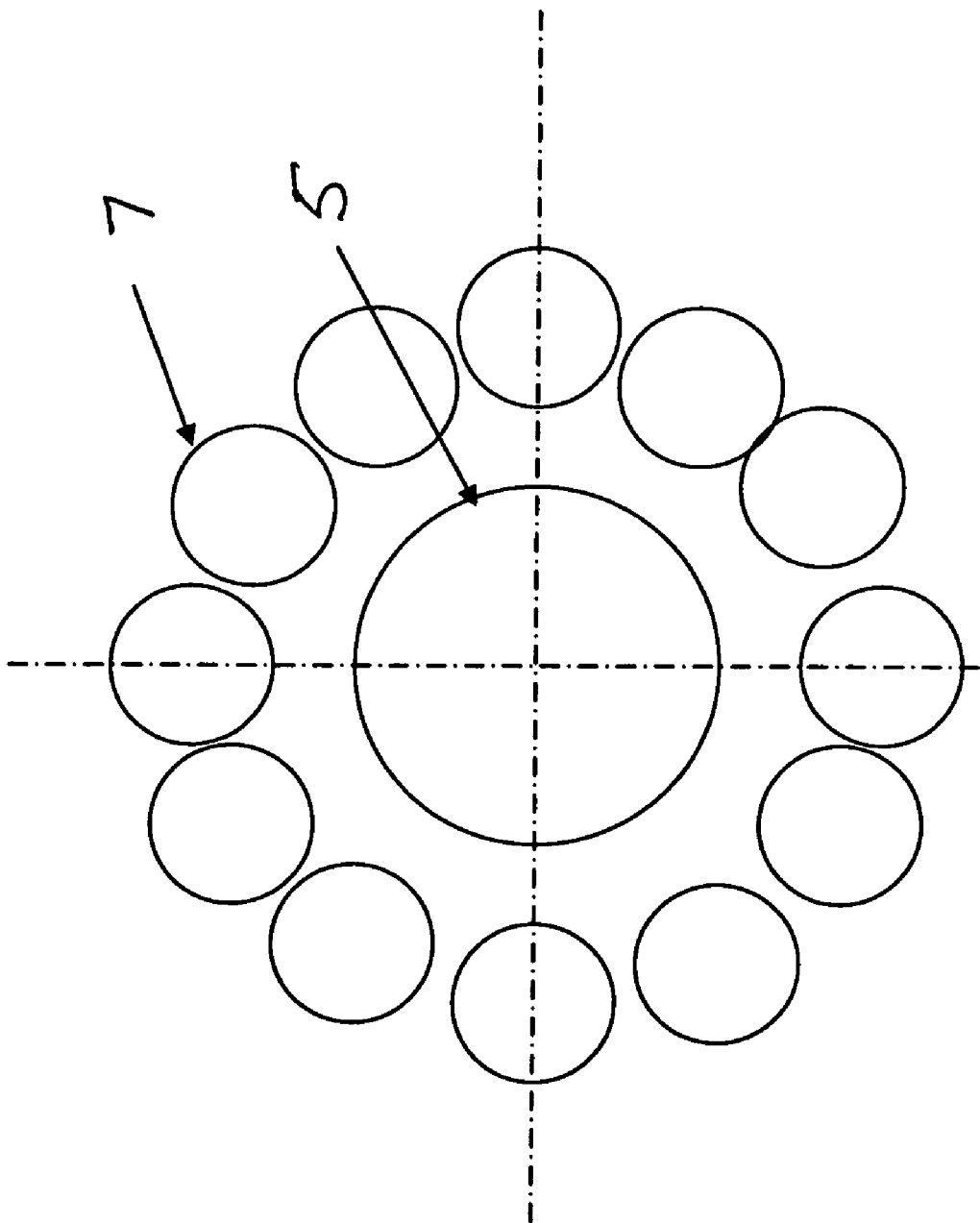

COUNTERWEIGHT BASED ROCKET LAUNCH PLATFORM

TECHNICAL FIELD

Embodiments are generally related to rocket launch methods, devices and systems. Embodiments are additionally related to counter-weight lifting methods, devices and systems. Embodiments are also related to terrain based rocket launch facilities.

BACKGROUND

Most of the launch systems in use today operate from a standstill at or near sea level. The disadvantage of these systems is that they launch the greatest distance to space and through the thickest part of the atmosphere. They must carry enough fuel to not only lift the payload but also to carry fuel to lift the fuel. It is a problem of near exponential growth.

In the case of the space shuttle, half the fuel (1.5 million pounds) is used in the first 8 seconds getting to a height of only 300 ft. Typically, the first stage of a launch system is used to get the rocket and payload from a standstill through the lower atmosphere. These first stases are the largest and consume the most fuel and are the most expensive part of the launch vehicle. These three factors cause conventional launch systems to use 30 to 50 lbs of fuel to lift 1 lb of payload into space.

In addition, most launch facilities are located in coastal regions where they are subjected to severe weather and can be inoperable for periods of time. From a military perspective they are also vulnerable to attack with little natural protection. In association with this invention, ramjet technology uses onboard fuel and atmospheric oxygen for propulsion. Ramjets can't start from a standstill and need to be accelerated by other means to reach their startup conditions.

The majority of satellites are placed into the equatorial orbit plane and so launches from near the equator require less fuel. At least two mountains are located near the equator and would be good candidates for this invention. The first is Mt Chimbora in Ecuador, a 20,000 ft mountain about 25 km from the equator. The second is Mt Kenya in Kenya, a 17,000 ft mountain on the equator.

Based on the foregoing, it is believed that an improved rocket launching technology is necessary to increase efficiency in putting payloads into space. It is believed that systems and methods disclosed here offer a solution to the problems inherent with current methods of launching rockets.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide for an improved rocket launching system and methods.

It is another aspect of the present invention to provide for an improved counterweight lifting system and method.

It is yet another aspect of the present invention to provide for an improved terrain based rocket launch facility.

The above and other aspects of the invention can be achieved as will now be briefly described. A rocket launch system and method are disclosed, which generally include using naturally available assets (gravity and oxygen) before resorting to onboard propellants. It is proposed to use a counterweighted platform inside the mountain to accelerate the rocket to speeds near 500 mph and higher and release it into the thinner atmosphere around 20,000 ft. Next, a ramjet could be employed until insufficient oxygen is available to support combustion at which point onboard propellants would be used to complete the ascent into space. The invention is designed to accommodate the existing fleet of launch vehicles to include Atlas, Delta, Ariane, Zenit, Proton, Progress, Long March, and H1.

The present invention is a mountain launch system that uses gravity to provide the initial ascent for the rocket and payload. This is accomplished through the use of a counterweighted launch platform. The launch platform ascends vertically within a launch tube while counter weights descend in parallel tubes that surround the launch tube. The launch platform is attached to the counterweights with a high strength wire rope that routes over a pulley at the top of the launch tube.

This system is incorporated into a structure or mountain which provides the support for the system. The length of the launch tube is determined by the mountain and surrounding geography. A man-made structure could also be utilized or a deep hole with the same concept.

Ideally, the launch location should be close to the equator for equatorial plane destinations or other locations for different destination orbits (such as a polar orbit). Mt Kenya in Kenya near the east coast of Africa is a good candidate location. Mt Chimbora in Ecuador near the West coast of South America is another candidate location.

The rocket would be brought in by means of an access tunnel horizontally at the bottom of the launch tube. Then, the rocket would be erected and placed on the launch platform.

Another feature of this invention is to seal the launch tube by closing doors at the bottom and placing a thin membrane over the exit. Once sealed, the system can be evacuated to create a near vacuum. The low pressure will allow the rocket and payload to free ascent without a terminal velocity caused by aerodynamic drag. Upon nearing the exit of the launch tube the rocket will separate from the launch platform which will then be brought to a stop through braking. The rocket payload fairing will pierce the membrane upon exiting the launch tube and the onboard propellants will then be used to propel the rocket and payload into space.

Additional uses for this facility could be used for free fall research or low gravity manufacturing, the movie industry, or a thrill ride. It may also be filled with water and used for testing and development of deep sea submersibles or research.

BRIEF DESCRIPTION OF THE DRAWINGS

The accompanying figures, in which like reference numerals refer to identical or functionally similar elements throughout the separate views and which are incorporated in and form part of the specification, further illustrate embodiments of the present invention.

FIG. 2 illustrates a top view of the cross section of the mountain launch system in accordance with an alternative embodiment;

DETAILED DESCRIPTION OF THE INVENTION

The particular values and configurations discussed in these non-limiting examples can be varied and are cited merely to illustrate embodiments of the present invention and are not intended to limit the scope of the invention.

Figure 1A:
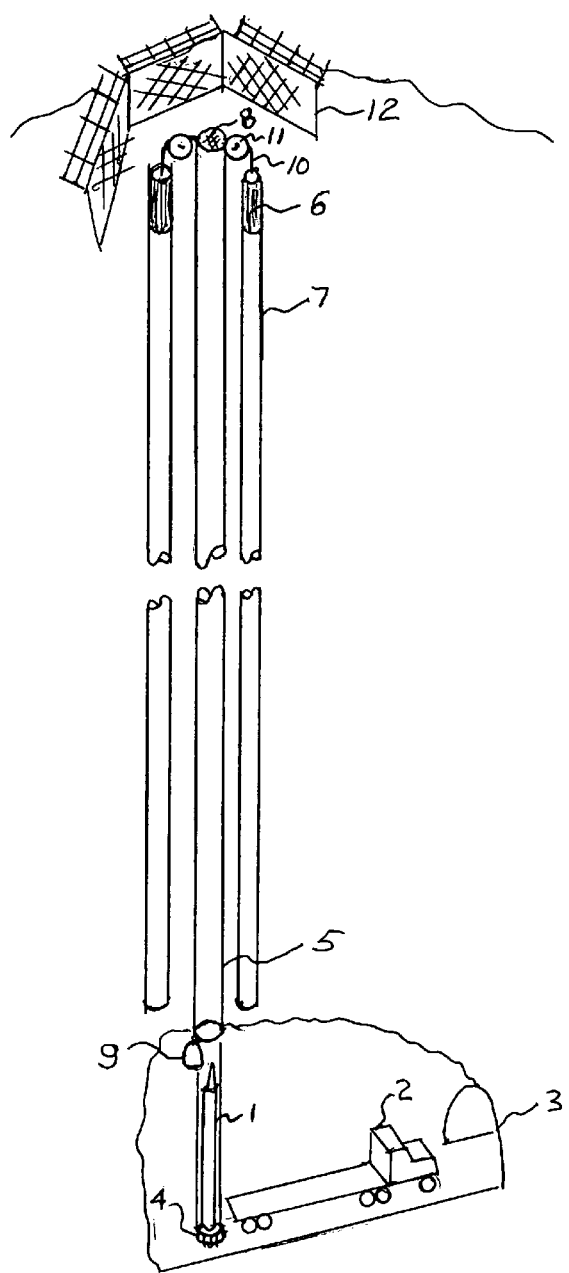
FIG. 1a illustrates an environmental isometric view of the mountain launch system in accordance with a preferred embodiment.
Figure 1B:
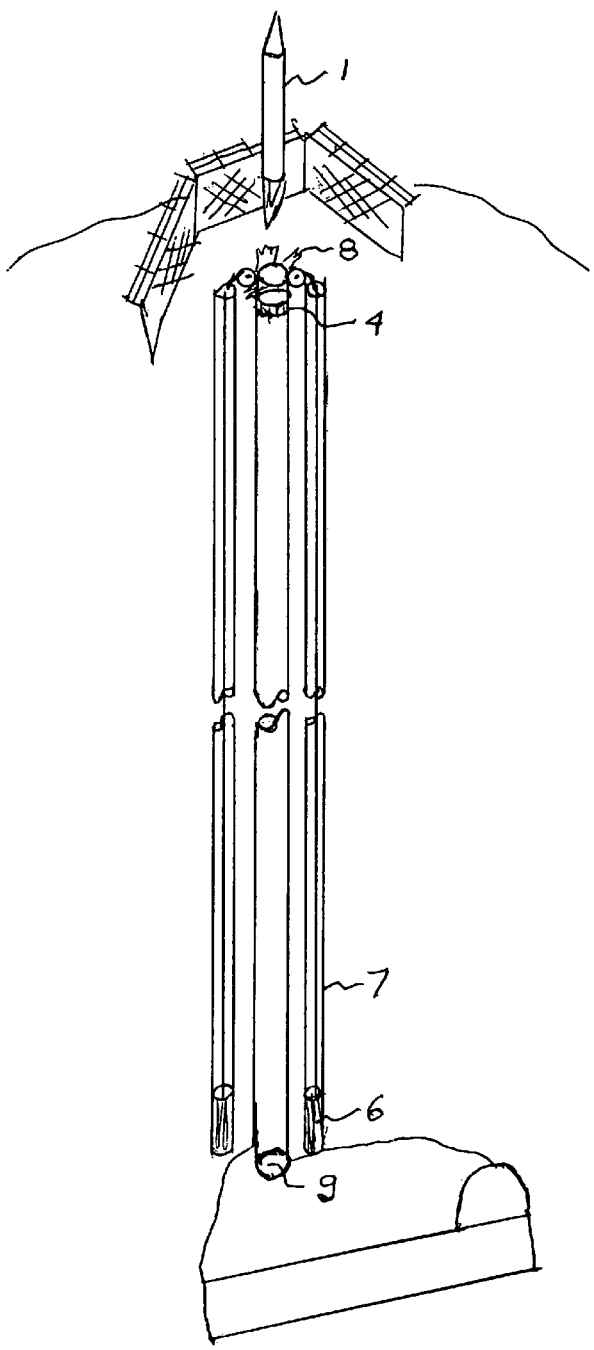
FIG. 1b illustrates another environmental isometric view of the mountain launch system reflecting the post launch configuration in accordance with a preferred embodiment.

FIGS. 1a and 1b are environmental isometric views of the mountain launch system. Only two counterweight tubes are shown for clarity. FIG. 1a shows the pre-launch configuration. The rocket 1 is brought in on a truck 2 through an access tunnel 3. The rocket is then placed onto the launch platform 4 below the launch tube 5. The counterweights 6 are shown in their upper position at the top of the counterweight tubes 7. There is a thin membrane 8 stretched across the top of the launch tube and a door 9 at the bottom of the launch tube which when closed will allow the system to be evacuated to minimize aerodynamic drag. The counter weights are attached to the launch platform with high strength wire ropes 10 routed over pulleys 11 located between the launch and counterweight tubes. A security fence 12 is partially shown on top of the mountain to keep people and animals clear of the launch top opening.

FIG. 1b show the post-launch configuration. The counter weights 6 are depicted in a descended position in the counterweight tubes 7. The lower launch tube door 9 is in the closed position and the thin membrane 8 on top of the launch tube is shown in its torn position. The launch platform 4 is depicted in its decelerated position at the top of the launch tube.

FIG. 2 is a top down view of the mountain launch system. It depicts the counterweight tubes 7 configured around the launch tube 4.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A rocket launching system, comprising:
    a counterweighted platform for launching a rocket;
    a launch tube to allow said counterweighed platform to lift said rocket;
    a plurality of counterweights connected to said counterweighted platform with a high strength wire rope which routes over a pulley at a top of said launch tube;
    a plurality of counterweight tubes to allow said counterweight to gravitationally fall;
    a membrane to create a near vacuum in order for a low pressure to allow said rocket to free ascent without a terminal velocity caused by an aerodynamic drag; and
    a delivery mechanism for transporting said rocket to said counterweighted platform.

2. The system of claim 1 wherein said system is incorporated in a mountain.

3. The system of claim 1 wherein said system comprises a free-standing launching cylinder.

4. The system of claim 1 wherein said system is located near the equator for equatorial plane destinations.

5. The system of claim 1 wherein said delivery mechanism further comprises an access tunnel horizontally displaced at a bottom of said launch tube.

6. The system of claim 1 wherein said rocket comprises Atlas, Delta, Ariane, Zenit, Proton, Progress, Long March, and H1 launch vehicles.

7. The system of claim 1 further comprising a ramjet that is employable until insufficient oxygen is available to support combustion at which point an onboard propellant is used to complete an ascent into space.

8. The system of claim 1 wherein said launch tube is secured with a fence line.

9. A rocket launching system, comprising:
    a counterweighted platform to launch a rocket, wherein said counterweighted platform accelerates said rocket to be released into a thinner atmosphere of approximately 20,000 ft;
    a launch tube to allow said counterweighted platform to lift said rocket, wherein said rocket comprises Atlas, Delta, Ariane, Zenit, Proton, Progress, Long March, and H1 launch vehicles;
    a plurality of counterweights connected to said counterweighted platform with a high strength wire rope which routes over a pulley at a top of said launch tube;
    a plurality of counterweight tubes to allow said counterweight to gravitationally fall;
    a membrane to create a near vacuum in order for a low pressure to allow said rocket to free ascent without a terminal velocity caused by an aerodynamic drag;
    a delivery mechanism for transporting said rocket to said counterweighted platform, said delivery mechanism comprising an access tunnel horizontally displaced at a bottom of said launch tube; and
    a ramjet that is employable until insufficient oxygen is available to support a combustion at which point an onboard propellant is usable to complete an ascent into space.

10. The system of claim 9 wherein said system is located inside a mountain or a free-standing facility near the equator for equatorial plane destinations.

11. The system of claim 9 wherein said launch tube is secured with a fence line.

12. A rocket launching method, comprising:
    providing a counterweighted platform to launch a rocket;
    providing a launch tube to allow said counterweighted platform to lift said rocket;
    providing a plurality of counterweights connected to said counterweighted platform with a high strength wire rope, which routes over a pulley at a top of said launch tube;
    providing a plurality of counterweight tubes to allow said counterweight to gravitationally fall while simultaneously lifting said counterweighted platform;
    sealing said launch tube with a membrane to create a near vacuum in order for a low pressure to allow said rocket to free ascent without a terminal velocity caused by an aerodynamic drag; and
    providing a delivery mechanism for said rocket to said counterweighted platform in said launch tube, thereby providing a system capable of delivering a rocket into space, said system including said counterweighted platform, said plurality of counterweights, said plurality of counterweight tubes, said lunch tube and membrane in association with said delivery mechanism.

13. The method of claim 12 further comprising incorporating said system in a mountain.

14. The method of claim 12 further comprising configuring said system as a free-standing launching cylinder.

15. The method of claim 12 further comprising locating said system near the equator for equatorial plane destinations.

16. The method of claim 12 further comprising modifying said delivery mechanism to include an access tunnel horizontally displaced at a bottom of said launch tube.

17. The method of claim 12 further comprising configuring said membrane to be capable of being pierced by said rocket as said rocket leaves said launch tube.

18. The method of claim 12 wherein said rocket comprises Atlas, Delta, Ariane, Zenit, Proton, Progress, Long March, and H1 launch vehicles.

19. The method of claim 12 further comprising employing a ramjet until insufficient oxygen is available to support a combustion at which point an onboard propellant is usable to complete an ascent into said space.

20. The method of claim 12 further comprising securing said launch tube with a fence line.

* * * * *